United States Patent Office 3,516,394
Patented June 23, 1970

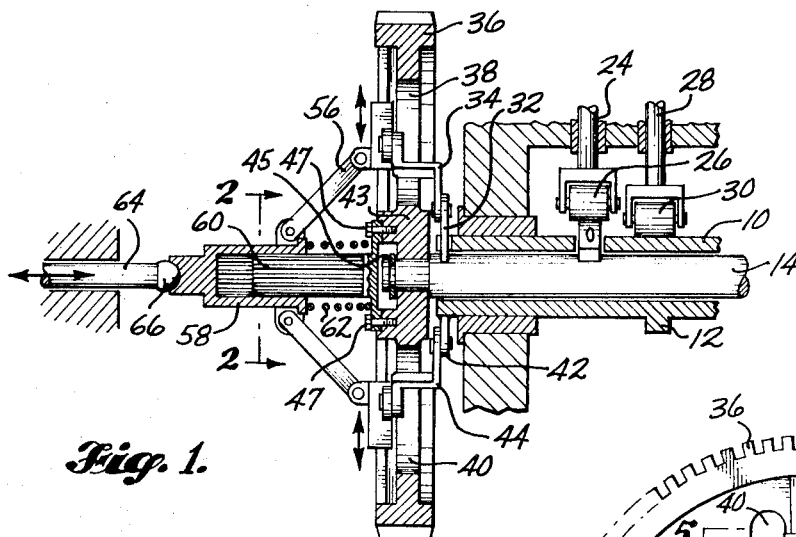

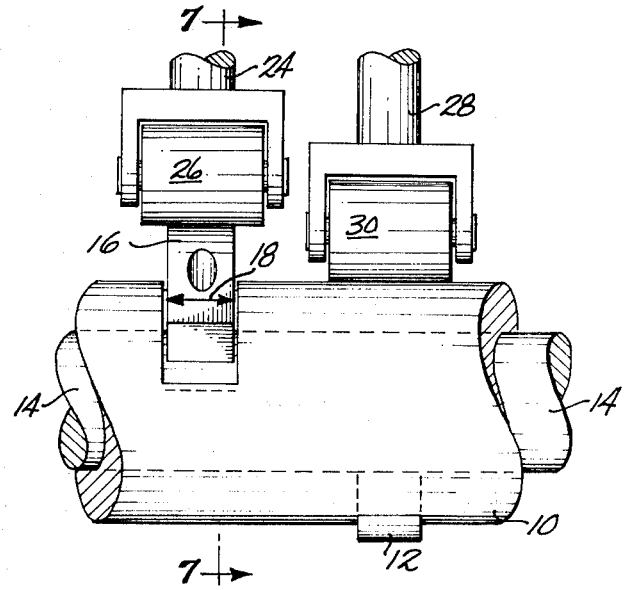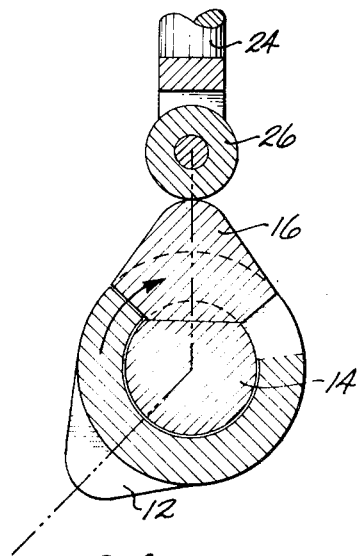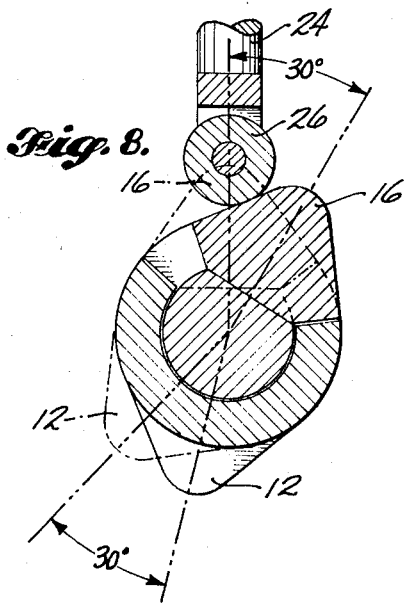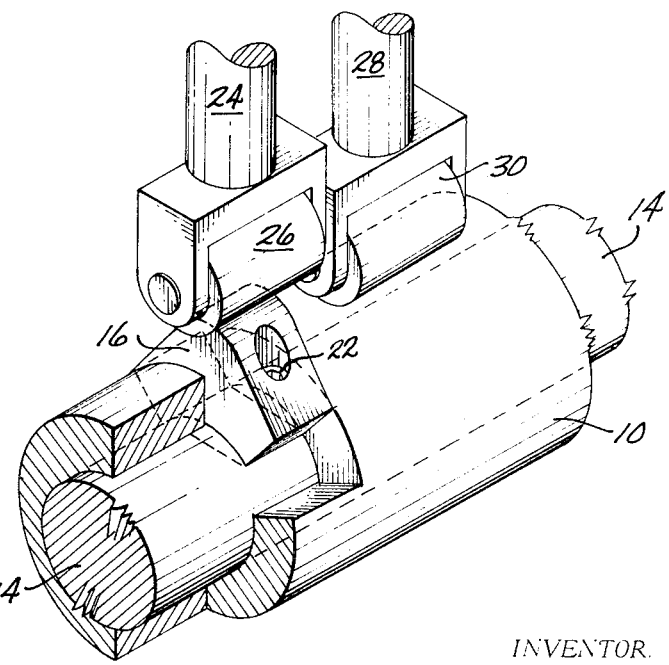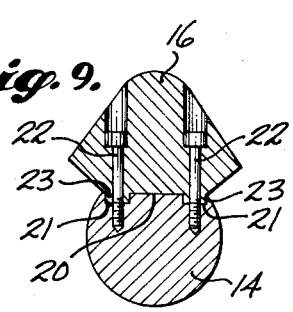

3,516,394
DEVICE FOR SIMULTANEOUSLY ADVANCING INTAKE CAM LOBES AND RETARDING EXHAUST CAM LOBES OF AN INTERNAL COMBUSTION ENGINE WHILE THE ENGINE IS RUNNING
Roy G. Nichols, 5043 Elder Road, Ferndale, Wash. 98248
Filed July 16, 1968, Ser. No. 745,257
Int. Cl. F01k 54/04; F01l 1/34
U.S. Cl. 123—90
4 Claims

ABSTRACT OF THE DISCLOSURE

This invention relates to a two-part camshaft mechanism for an internal combustion engine wherein one part carries the lobes for operating the intake valves of the engine and the other part carries the lobes for operating the exhaust valves and relative angular positions of the two parts may be changed during running of the engine. The intake valves may be advanced and simultaneously the exhaust valves may be retarded, during running of the engine, so that a selected and desired relation between them may be obtained for a particular engine speed. The two-part camshaft mechanism includes an outer, tubular camshaft having lobes and an inner camshaft having lobes projecting through slots in the outer camshaft.

My invention relates to the valving mechanism of an internal combustion engine and has particular advantages to engines using fuel injection systems, as diesels.

More particularly, my invention relates to a camming mechanism for controlling the opening and closing of the intake and exhaust valves of such an engine so that they may be timed in relation to the position of their associated piston of the engine at top dead center of the piston (hereinafter referred to as TDC) and with the intake valves in advance of TDC and the exhaust valves retarded from TDC.

It has been recognized that as the speed of rotation of an internal combustion engine is increased, that advantages obtain in advancing the operation of the intake valves to TDC. However, most cam mechanisms have been preset and the drive mechanism is fixed so that the timing of the intake valve mechanism is set for maximum efficiency at a particular speed range. For example, many racing automobiles must be towed to race tracks as they do not operate well at ordinary highway and city speeds.

In connection with the ignition of internal combustion engines, it has been recognized that the ignition should be retarded as to TDC for slow or idling speeds and advanced for faster speeds. Devices to accomplish such ends are not common.

It has also been recognized that if the intake valves are advanced as to TDC for a given rotation of engine speed, then the exhaust should be retarded as to TDC for the greatest efficiency at such speed.

However, heretofore, devices to simultaneously and adjustably advance the operation of the intake valves to TDC and to retard the operation of the exhaust valves as to TDC, while the engine is running, have not been available.

It is an object of my invention to provide mechanism so that the intake valves of an engine may be advanced selected extents as to TDC and simultaneously the exhaust valves may be retarded comparatively selected extents as to TDC and this while an engine is running to select the most desirable extent of such advancing and retarding for any given engine speed.

Other objects and advantages will become apparent or implicit from the following description of one embodiment of my invention, illustrated in the accompanying drawings, wherein like reference numerals refer to like parts.

In the drawings:

FIG. 1 is a longitudinal sectional view of a camshaft and associated mechanisms, with parts broken away, of a device embodying my invention and taken substantially on broken line 1—1 of FIG. 3;

FIG. 2 is a view taken substantially on broken line 2—2 of FIG. 1;

FIG. 3 is a view similar to FIG. 2 and with parts disposed in different adjusted positions than those shown in FIG. 2;

FIG. 4 is a view similar to FIG. 2, with a portion broken away, and with the parts disposed in still different adjusted positions;

FIG. 5 is a fragmentary view, on a larger scale, partly in plan and partly in section, and taken substantially on broken line 5—5 of FIG. 1;

FIG. 6 is a fragmentary elevational view showing a tubular outer cam shaft with a cam lobe thereon and a lateral opening, an inner camshaft with a cam lobe thereon and which lobe projects outwardly through the lateral opening in the tubular outer camshaft, and associated valve mechanisms;

FIG. 7 is a sectional view taken substantially on broken line 7—7 of FIG. 6;

FIG. 8 is a view similar to FIG. 7 showing by dot and dash lines the relative positions of the cam parts as shown in FIG. 7 and shown by full lines relative positions to which they may be adjusted;

FIG. 9 is a sectional view through the inner camshaft and its lobe to illustrate a means of detachably securing the same together; and FIG. 10 is a perspective view of the structure shown in FIG. 6.

Referring now to FIGS. 6 to 10, inclusive, of the drawings, my invention comprises two camshaft parts which are movable angularly relative to each other and the amount of such movement is adjustable while such camshafts are rotating as a camshaft mechanism. A tubular outer camshaft 10 is mounted in an internal combustion engine in a conventional manner (not shown) and constitutes a first camshaft part. Outer camshaft 10 rigidly carries an outer camshaft lobe 12 projecting radially outwardly therefrom. An inner camshaft 14 is coaxial with the outer camshaft 10 and detachably carries an inner camshaft lobe 16. Outer camshaft 10 is provided with lateral slot openings 18, each of which is longitudinally offset relative to a cam lobe 12 and a camshaft lobe may project radially outwardly through each of said slots 18. For each piston and cylinder of an internal combustion motor (only a fragment being shown), there will be two camshaft lobes 12 and 16, one to operate the intake valve mechanism and the other to operate the exhaust valve mechanism of such a cylinder. In the interest of brevity and clarity, only two camsnaft lobes and associate parts for a single cylinder of an internal combustion motor are illustrated. However, the showing of a pair of such lobes for each cylinder of a multi-cylinder internal combustion motor will tend to obscure rather than aid in the drawings.

To provide for assembly and disassembly of the said camshaft parts, the inner camshaft lobe 16 is detachably mounted (see FIG. 9) on the inner camshaft 14. A suitable form of such mounting comprises a flat portion 20 on shaft 14 having therein a keyway or keyways 21 snugly interfitting and receiving spline portions 23 carried by inner camshaft lobe 16 to fix the said lobe 16 against the thrust present as lobe 16 is revolved and raises and permits the lowering of its associated valve stem mechanism. Also, the said inner camshaft lobe 16 is held against radial displacement by set screws 22 securing said lobe 16 against inner camshaft 14. From the foregoing, other mechanical means for securing the lobe 16 to the inner camshaft 14, so that the two camshaft parts 10 and 12 may be assembled and disassembled, will be obvious. To assemble, the inner shaft 14 is slid, in a direction from left to right as respects FIG. 10, into the center of outer tubular shaft 10 and then the lobes 16 are secured in place.

The inner camshaft lobe 16 will raise a valve stem 24, which may be the stem of an intake valve mechanism (only fragmentarily shown), through conventional means as a cam follower roller 26 and permits the said stem 24 to move to closed position under spring pressure under a conventional spring loaded valve stem mechanism (not shown). Similarly, the other camshaft lobe, outer camshaft lobe 12, will function to control the opening and closing of the other or exhaust valve stem 28 and whose opening and closing is controlled by the cam follower roller 30. Preferably, the cam follower rollers 26 and 30 are wider than the cam lobes 16 and 12 to provide for better following of a camming surface provided by lobe 16 and the outer surface of camshaft 10 in one instance and lobe 12 and the outer surface of camshaft 10 in the other instance.

Referring to FIG. 7, the cam lobe 16 (for operating intake valve stem 24) is illustrated to start opening the intake valve at 0° to TDC (top dead center of the associated piston). The relative position of such lobe 16 to such TDC is adjustable during rotation of the camming mechanism (comprising outer camshaft 10 and its lobe 12, and inner camshaft 14 and its lobe 16 and herein referred to as the camming mechanism) from 0° at such TDC to a given *advance* (as up to 30° before such TDC)—thus, the dot-and-dash line position of lobe 16 shown in FIG. 8 is the same as the full line showing in FIG. 7 and is 0° TDC. The full line position of lobe 16 in FIG. 8 is at 30° before or in *advance* of such TDC. Also, the position of the lobe 12 (for operating the exhaust valve stem 28) to such TDC is shown in FIG. 7 and by the dot-and-dash lines in FIG. 8, as 0° TDC. It will be noted in connection with FIG. 8 (full line position of lobe 12), that the lobe 12 (for operating the exhaust valve stem) is adjustable in the opposite direction and is adjustable from such 0° TDC (shown by dot-and-dash lines) to 30° *after* or retarded from TDC shown by full lines. By mechanism hereafter described and during rotation of the camming mechanism, the exhaust lobe 12 may be adjustably retarded and intake lobe 16 may be adjustably advanced and over a substantial range, such as 30° in said opposite directions relative to TDC.

Now referring to FIGS. 1-5, inclusive, two levers or arms 32, each having one end portion thereof secured to the inner camshaft 14 and having their other end portions extending radially outwardly therefrom and each is connected to a link 34. In order that the mechanism for adjusting and retarding of the intake lobe and exhaust lobe may be suitably located, a camshaft driving gear 36 is provided with pairs of slots or openings 38 and 40 therethrough and through each of the openings 38, a link 34 is extended. While one lever 32 and one link 34 (instead of a pair thereof) may perform functions hereinafter described, it is preferable that such lever and link combinations are in pairs. This is also true of links 42 and levers 44 connected with the outer camshaft 10. Two levers or arms 42, each has one end portion thereof secured to outer camshaft 10 and has its other end portion extending radially therefrom and connected to a link 44. Through each of the openings 40 in camshaft driving gear 36, a link 44 is extended.

As the lobes 16 are removably connected with the inner camshaft 14, they may be removed and the inner camshaft 14 may be inserted into the tubular outer camshaft 10 in a direction from left to right as viewed in FIG. 1. Then the hub 43 of camshaft gear 36 may be slidingly mounted on inner camshaft 14 and an O-ring 45 will prevent longitudinal movement therebetween but will permit relative turning or rotary movement. After mounting the inner camshaft 14 in the tubular outer camshaft 10, then lobes 16 may be secured in place by set screws 22.

A keyway 46 is secured to the face of camshaft driving gear 36 which face is remote from the camshafts 10 and 14 by stud bolts 47. Slides 48 and 50 are keyed to said keyway 46 and are movable in a direction toward and away from the center of driving gear 36. One link 34 is connected by pivot means 52 with slide 48 and one link 44 is connected by pivot means 54 with said slide 48. Also, one link 34 is connected by pivot means 52 with slide 50 and one link 44 is connected by pivot means 54 with slide 50. One end portion of a link 56 is pivotally connected with slide 48 and the other end portion of link 56 is pivotally connected with a yoke 58. One end portion of the link 57 is pivotally connected with slide 50 and the other end portion of link 57 is pivotally connected with yoke 58. Yoke 58 is preferably internally longitudinally splined and is slidably mounted on a stub shaft 60 which is externally longitudinally splined. A compression spring 62 urges yoke 58 against an adjustable stop 64. Bearing means 66 illustrates a nonrotating and antifriction stop for engaging and positioning the rotating yoke 58.

When the parts are in the relative positions shown in FIGS. 1, 2, and 7 (also dot-and-dash line position FIG. 8), the exhaust cam lobe 12 is timed for 0° TDC and the intake exhaust lobe 16 is timed for 0° TDC. The slides 48 and 50 tend to move radially outward because of centrifugal force which is counteracted by compression spring 62 acting in the opposite direction. As the adjustable stop 64 (FIG. 1) is moved to the right as respects the showing in FIG. 1 and spring 62 is compressed, the links 56 and 57 pivot at their end portions and slides 48 and 50 move radially outwardly and an intermediate position thereof is shown in FIG. 3. With such movement through the links 34 and levers 32, the inner camshaft 14 angularly moves and the lobes 16 thereon angularly move (clockwise as respects the showing in FIG. 8) and the operation of the intake valve operated by stem 24 is advanced as to TDC. At the same time through the links 44 and levers 42, the outer camshaft 10 angularly moves and the lobes 12 thereon move (counterclockwise as respects the showing in FIG. 8) and the operation of the exhaust valve operated by lobe 12 and stem 28 is retarded as to TDC.

In FIG. 4, the parts have moved to the position indicated by the full lines of FIG. 8. In such position the yoke 58 (FIG. 1) has been moved inwardly (or toward the right as respects the showing in FIG. 1), spring 62 has been compressed, the links 56 and 57 are substantially vertical, and the slides 48 and 50 have moved radially outwardly their greatest amount. The radial movement of the slides 48 and 50 is translated, through links 34 and levers 32, to arcuate movement of inner camshaft 14 and an intake lobe 16 has moved to 30° advance before TDC. Also, in such position, the radial movement of slides 48 and 50 is translated, through links 44 and levers 42, to arcuate movement of the outer camshaft 10 and exhaust lobe 12 has moved to 30° retard after TDC.

Herein, I have mentioned a maximum advance of the intake valves with a simultaneous maximum retard of the exhaust valves as 30° relative to TDC. Mechanically, obviously, greater amounts are possible but I find for practical purposes that greater amounts are not necessary. The thirty degree variation mentioned will enable the operator of the engine, and in particular in connection with diesels, to maintain the same air to fuel ratio of the mixture delivered to the cylinders and at all engine speeds. Also, by selecting a desired advance of intake valves and a desired retarding of exhaust valve for a given engine speed while the engine is running, an operator may adjust the valve timing for maximum efficiency at such given speed.

Camshaft driving gear 36 is not directly attached to either of the camshafts 10 and 14 and is shown as rotatably mounted on inner camshaft 14. However, gear 36 is connected to keyway 46 by stud bolts 47. In turn keyway 46 is connected through slides 48 and 50, levers 32 and links 34, and levers 42 and links 44 to the inner camshaft 14 and outer camshaft 10, thus providing for transmission of rotary motion between gear 36 and camshafts 14 and 10.

Stub shaft 60 is preferably connected to yoke 58 through the external splines on stub shaft 60 and the internal splines on yoke 58. While such spline connection is not necessary, it is preferable and permits longitudinal sliding movement of the yoke 58 relative to the stub shaft 60. Such longitudinal sliding movement of yoke 58 is translated into relative angular movement of inner camshaft 14 and intake lobe 16 thereon through links 56 and 57, slides 48 and 50, links 34 and levers 32 and is translated into relative angular movement of outer camshaft 10 and exhaust lobe 12 thereon through links 56 and 57, slides 48 and 50, links 44 and levers 42.

Camshaft driving gear 38 is connected by conventional means (gear means or a chain) with the crank shaft (not shown) of the engine.

From the foregoing it will now be apparent that by adjusted longitudinal movement of stop 64, the camshaft 10 and the exhaust lobes 12 thereon may be relatively angularly moved to retard a number of degrees after TDC and simultaneously the camshaft 14 and the intake lobes 16 thereon may be relatively angularly advanced a number of degrees before TDC and all this while the camshafts 10 and 14 are rotating and functioning jointly as a camshaft mechanism.

Also, it will now be apparent that FIGS. 6 and 10 are fragmentary views illustrating only one exhaust lobe 12 on camshaft 10 and only one intake lobe 16 on camshaft 14 but that each of said shafts can carry, respectively, additional longitudinally spaced exhaust lobes and intake lobes to take care of an engine having multicylinders. Also, the outer camshaft 10 may carry intake cam lobes rather than exhaust cam lobes if the inner camshaft 14 carries exhaust cam lobes rather than intake cam lobes.

A suitable lever with adjustable stop positioning means (not shown) is connected with adjustable stop so that relative longitudinal positions of adjustable stop 64 may be obtained and at any time during rotation of the camshaft mechanism (comprising camshaft parts 10, 14) and the internal combustion motor of which they form a part.

It will now become explicit and implicit that I have provided a camshaft mechanism for an internal combustion engine having two camshaft parts, as tubular outer camshaft 10 and inner camshaft 14. The said camshafts carry valve lifting lobes, as 12 and 16, and either shaft may carry the intake or exhaust lobes and the other shaft will carry the other of said lobes. Both camshaft parts are rotatably mounted to rotate together as a camshaft mechanism. The two shafts are connected together through links and levers so that during rotation thereof, or even when they are not rotating, the angular positioning of one of the camshaft parts and the lobe or lobes thereon may be relatively changed as respects the other camshaft part and the lobe or lobes thereon.

Preferably, the outer camshaft 10 is provided with a lateral opening 18, or a plurality of longitudinally spaced openings 18 in the event of a multicylinder engine, so that the lobes 16 on the inner camshaft 14 may project outwardly through said openings 18 and control the operation of cam followers 16 which in turn will control the operation of valve stems 24. The outer camshaft 10 is also provided with a lobe or lobes 12 so that the lobes 12 will project outwardly from outer camshaft 10 and control the operation of cam followers 30 which in turn will control the operation of valve stems 28.

For a multicylinder engine, the lobes 12 on the outer tubular camshaft 10 and the lobes 16 on the inner camshaft 14 are longitudinally offset and circumferentially spaced.

The preferable construction for relatively angularly moving and adjusting the two camshaft parts is one where the same may be accomplished during rotation of the two cam parts as the camming mechanisms of an engine. This preferably comprises means to translate relative angular movement of the two camshaft parts to longitudinal movement of an adjustable stop, as adjustable stop 64, and a first lever 42 connected with outer camshaft 10 and extending generally radially outwardly therefrom and a second lever 32 connected with inner camshaft 14 and extending generally radially outwardly therefrom.

More specifically, I have provided a camshaft driving gear 36, which is not directly connected with said camshafts 10 and 12 but is connected with the same through levers 42 and 32 and links 44 and 34 which extend through openings 40 and 38 in driving gear 36 and which links 44 and 34 are connected with said driving gear 36.

Further, and more specifically, I have provided two radially movable slides 48 and 50 which are mounted on a keyway 46 on the face of said driving gear 36, which is opposite to said camshafts 10 and 14, and the keyway 46 is connected with said camshaft parts 10 and 14 through links and levers to provide the driving turning force. The sleeve or yoke 58 is slidable on stub shaft 60, two links 56 and 57 have their end portions pivotally connected with yoke 58 and with slides 48 and 50. Through the links 44 and 34 and levers 42 and 32 the sliding movement of yoke 58 is translated into relative angular movement of camshafts 10 and 14. In such combinations, the yoke 58 is preferably spring loaded by spring 62 urging the yoke 58 away from driving gear 36 and counter to the direction of thrust imposed on yoke 58 by centrifugal force. An adjustable stop 64 is movable predetermined amounts toward said driving gear 36 and counter to the thrust of spring 62.

Obviously, changes may be made in the forms, dimensions, and arrangements of the parts of my invention without departing from the principle thereof, the above setting forth only preferred forms of embodiment of my invention.

I claim:

1. A camshaft mechanism comprising a tubular outer camshaft having a lateral opening therein; a cam lobe disposed on the periphery of said outer camshaft; an inner camshaft coaxial with said outer camshaft and mounted for relative angular movement to said outer camshaft; a cam lobe disposed on the periphery of said inner camshaft and projecting outwardly through said lateral opening in said outer camshaft; means to angularly move said outer camshaft relative to said inner camshaft to adjust the arcuate distance between the lobe on the outer camshaft and the lobe on the inner camshaft comprising a first lever having one end portion connected with said outer camshaft and having the other end portion extending generally radially outwardly therefrom and a second lever having one end portion connected with said inner camshaft and having the other end portion thereof extending generally radially outwardly therefrom; means to rotate said outer and inner camshafts together as a camshaft mechanism; a driving gear coaxially mounted relative to said cam shafts, said gear having openings extending in an axial direction thereof; links connected with said first and second levers and extending through said opening; and means connecting said links with said gear.

2. The combination of claim 1 wherein two radially alined slides are mounted on the face of said gear opposite to said camshafts; a stub shaft is connected to said gear and projects in the direction opposite to said camshafts; a sleeve is slidably mounted on said stub shaft; two links each having an end portion thereof pivotally connected with said sleeve and each having its other end portion connected with the other end portion of one of said levers.

3. The combination of claim 2 wherein spring means resiliently urge said sleeve away from said gear.

4. The combination of claim 2 wherein adjusting means are provided urging said sleeve predetermined amounts toward said gear.

References Cited

UNITED STATES PATENTS 907,669  12/1908  Worth.
1,301,972  4/1918  Ricardo.
1,527,456  2/1925  Woydt et al.

FOREIGN PATENTS 1,109,790  9/1955  France.
527,398  10/1940  Great Britain.

AL LAWRENCE SMITH, Primary Examiner

U.S. Cl. X.R.

74—568